TWO-WAY TRUNK CIRCUIT

Original Filed June 16, 1966 2 Sheets-Sheet 1

INVENTORS: L. J. GILBOY
R. L. HAYES
E. D. MASUCCI
J. M. PATTERSON

BY: Donald M Duft

ATTORNEY

Jan. 20, 1970 L. J. GILBOY ET AL 3,491,213

TWO-WAY TRUNK CIRCUIT

Original Filed June 16, 1966 2 Sheets-Sheet 2

United States Patent Office 3,491,213

Patented Jan. 20, 1970

3,491,213

TWO-WAY TRUNK CIRCUIT

Lawrence J. Gilboy and Richard L. Hayes, Holmdel, N.J., and Eugene D. Masucci, Columbus, and James M. Patterson, Westerville, Ohio, assignors to Bell Telephone Laboratories, Incorporated, Murray Hill, N.J., a corporation of New York Continuation of application Ser. No. 558,064, June 16, 1966. This application Apr. 2, 1969, Ser. No. 812,596

Int. Cl. H04m *3/00*

U.S. Cl. 179—18 20 Claims

ABSTRACT OF THE DISCLOSURE

An improved two-way trunk associated with line and trunk circuits, a marker, a sender, and a signaling circuit. Possibility of simultaneous seizure from near and far end is reduced by briefly busying the trunk at the office where the last call originated, thus giving preference to subsequent calls from the other office. The E lead of a selected trunk is extended to the marker and monitored while the marker is setting up a connection between calling line and the trunk, permitting detection of distant-end seizure before make busy prior to commitment of the near-end marker.

Figure 1:
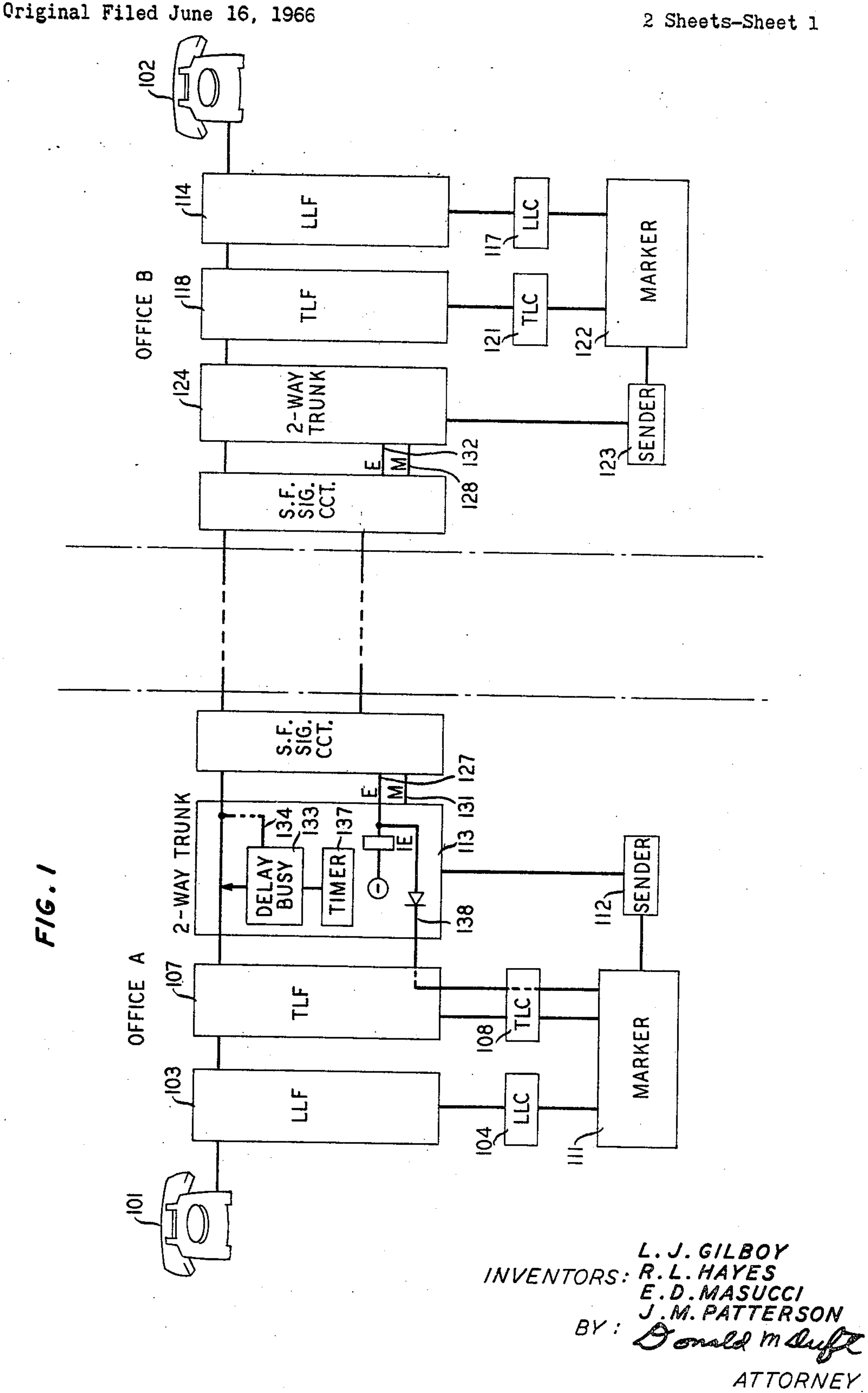

This is a continuation of copending application Ser. No. 558,064, filed June 16, 1966, and relates to a telephone system having a two-way interoffice trunk, and more particularly to means in such a system for reducing trouble conditions which may result when the trunk is simultaneously seized at both ends.

In most present day automatic telephone systems, such as the No. 5 crossbar system disclosed in A. J. Busch Patent 2,585,904 which utilizes two-way interoffice trunks, the trunks can be seized from either end, i.e., from either of the offices connected thereby. It frequently happens during peak load periods that the trunk groups are operated under heavy overload conditions. Under such conditions there is a great demand for all trunks and, as soon as a particular trunk is released, there is a good chance that it will be immediately and simultaneously reseized from both ends.

When a two-way trunk is seized at one end, the seizing office attaches a sender to the trunk and waits for the other office to attach a register and transmit a "start dialing" signal. It the event of a simultaneous seizure by both offices, the same action occurs at each end of the trunk, the "start dialing" signal is not transmitted by either office; and the two ends of the trunk remain in opposed condition until time-out occurs when the senders in each office are released and an alarm is initiated. The opposing action of the two ends of the trunk has come to be referred to as "glaring" and the condition as a "glare condition." These terms will be used hereinafter.

Obviously both of the atempted calls are lost through the glare condition. Other incidental troubles also may often occur such as stuck senders, false charges and the inefficient use of outgoing senders.

Accordingly it is an object of our invention to improve the operation of two-way trunks.

A more specific object of the invention is to reduce the frequency of occurrence of glare conditons in the use of two-way trunks.

A further specific object of the invention is to detect seizure of a two-way trunk at the distant end during the time a channel (switching network) connection is being completed to the near end of the trunk as a consequence of a prior or simultaneous seizure by the near end office.

In accordance with a specific embodiment of the invention, means are provided whereby each two-way interoffice trunk is temporarily directionalized after each call by artificially making the trunk busy of a short interval at the office where the last call originated; this gives preference to subsequent calls which originate at the other office. This, of course, reduces the possibility of simultaneous seizure. Also in accordance with the invention, the E (signaling) lead of a trunk selected by the marker in the seizing office is extended to the marker and is monitored during the time the marker is establishing a channel connection between the calling line and the selected trunk. This enables the detection, before the marker has been finally committed to establish the channel connection to the trunk, of possible instances where the selected trunk is also seized at the distant end before it has been made busy at that end by the marker signal transmitted from the near end office that priorly seized the trunk.

A feature of the invention is means for continuously monitoring a selected trunk during marker action in order to detect the possible seizure of the trunk at the distant end before the marker action has been completed at the near end.

A further feature of the invention is the additional use of the signaling lead associated with a two-way trunk for indicating seizure of the trunk at the distant end.

Figure 2:
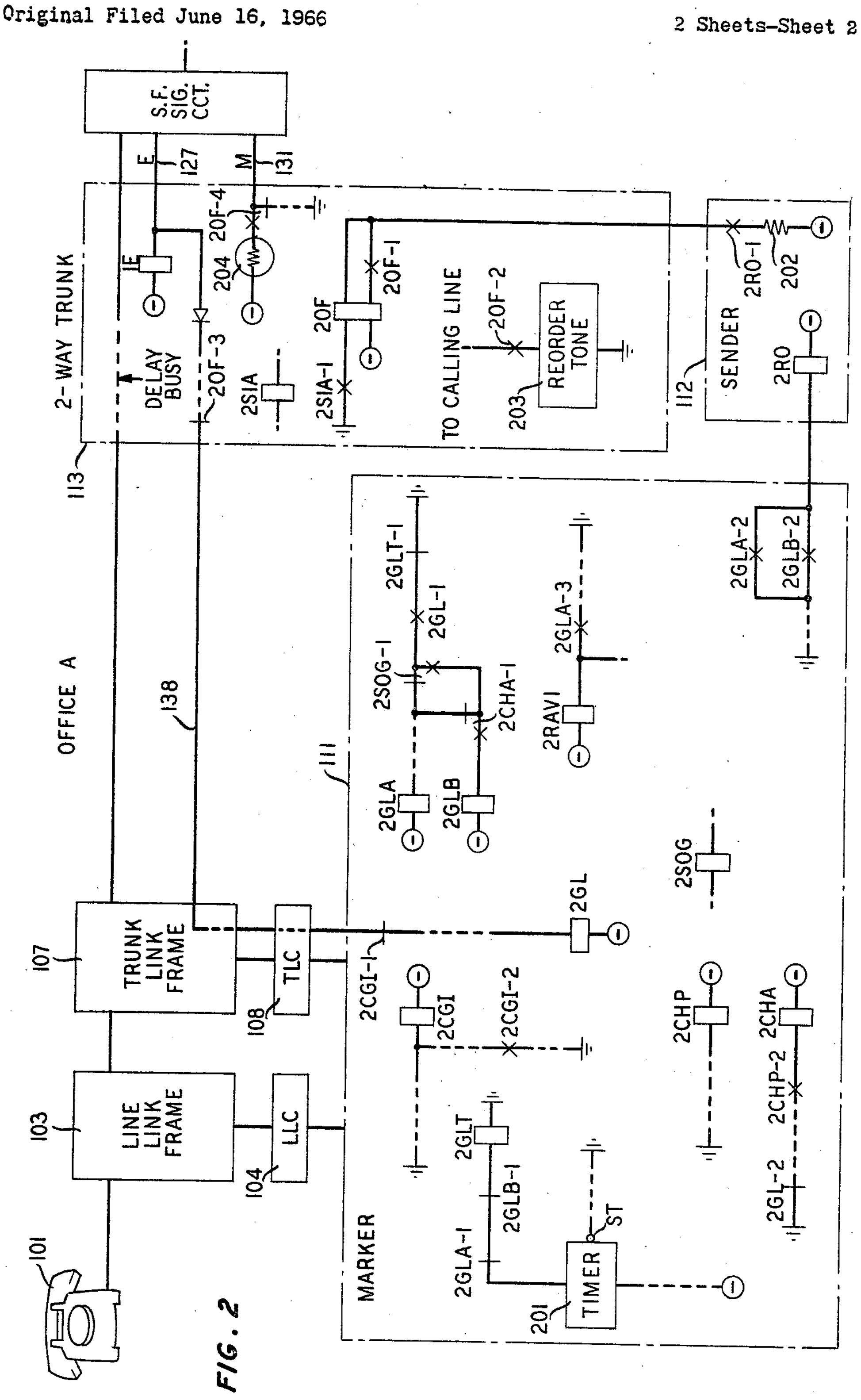

A full understanding of the arrangement contemplated by the present invention as well as an appreciation of the various advantageous features thereof may be gained from consideration of the following detailed description in connection with the accompanying drawing, in which:

FIG. 1 shows schematically the arrangement and relationship of certain of the basic individual circuits which comprise one specific illustrative embodiment of the invention; and FIG. 2 shows in detail certain of the circuits indicated in FIG. 1.

The arrangement and operation of the various components of the illustrative embodiment of the invention will be described in detail subsequently with reference to FIG. 2. However, in order to first gain a general overall understanding of the arrangement contemplated, a brief general description will be given at this point with particular reference to FIG. 1.

On FIG. 1 there are shown schematically certain of the basic elements of a No. 5 crossbar switching system of the type disclosed in the above-mentioned A. J. Busch Patent 2,585,904; the system is shown as being used for establishing a connection between telephone set 101 of Office A and telephone set 102 of Office B. During establishment of such a connection, telephone set 101 is connected through line link frame 103, line link connector 104, trunk link frame 107 and trunk link connector 108 to marker 111. Sender 112 and two-way trunk 113 are included in the completed connection in the manner well known in the art. Similarly, telephone set 102 at Office B is connected through line link frame 114, line link connector 117, trunk link frame 118 and trunk link connector 121 to marker 122, and sender 123 and two-way trunk 124 are included in the completed connection.

Each two-way trunk is equipped for E and M lead signaling as is well known in the art; at Office A, for example, the supervisory signals that are received from Office B over E lead 127 are those that originated on M lead 128 at the distant office. The supervisory signals transmitted from Office A to Office B originate on M lead 131 and are received over E lead 132. These supervisory signals may include "seizure," "start dial," "stop dial" and the like, the first signal received usually being the seizure signal which operates the respective 1E relay.

As pointed out above, a problem frequently occurs in connection with the use of two-way trunks in the type of system illustrated due to simultaneous seizure from both ends. That is, assuming that a call connection has just been terminated and, assuming further a period of heavy traffic between Offices A and B, there is a good chance that as soon as trunk 113, for example, has been released, there will be an immediate demand for its reseizure both from the Office A end for a call originating at that office and from the other end for a call originated at Office B; these conditions will be referred to hereinafter as "outgoing seizure" and "incoming seizure" respectively.

In accordance with a novel feature of the present invention a delay busy device 133 is provided in connection with trunk 113 (and similar means are provided in connection with trunk 124) whereby the trunk is temporarily "busied" so that it will not be seized from the Office A end immediately upon the termination of a call from Office A. This, of course, permits seizure from the Office B end for the servicing of a new call originating at that office and serves to prevent a glare condition.

The above instance assumes that the recently terminated call originated at Office A; if the call originated at Office B, then the two-way trunk 124 at Office B would have been artificially held busy in the same manner to permit its seizure for a new call originating at Office A.

Delay busy device 133 may comprise any one of several well-known arrangements for accomplishing its intended purpose. For example, it may include a relay triggered over lead 134 to operate upon release of a connection on a call that originated at Office A with the relay being effective while operated to apply an artificial busy indication to the markers at Office A. The relay is held operated for a predetermined interval by timer 137.

The delay busy arrangement just described has proven very effective in glare reduction since it temporarily gives preference with regard to each new call to the office other than that at which the last-completed call originated. Although the foregoing described expedient is reasonably effective, trouble still may arise after expiration of the delay busy time period due to the fact that after a trunk has been seized at one end and during the time the marker at the seizing end is establishing a channel between the selected trunk and the calling party, the trunk may be seized from the distant office for a call originating at that office. In effect we again have the possibility of a glare condition.

Accordingly, in accordance with a further novel feature of the invention, the E signaling lead 127 to the 1E relay is extended by lead 138 through the trunk link 107 and trunk link connector 108 to the marker 111 in order to permit continuous monitoring of the E lead by the marker during the time the marker is establishing a channel connection between the calling line, for example, from telephone set 101, and the two-way trunk 113. This permits detection, in a manner described in detail subsequently with reference to FIG. 2, of possible instances of an incoming seizure of the trunk for a call initiated at Office B before the trunk has been made busy at that end by a signal transmitted from marker 111. If such a seizure condition is detected, and provided the detection occurs before a certain point in the establishment of the channel connection at Office A has been reached, the marker of Office A will be caused to route advance and another trunk will be selected for the outgoing call. This will be fully described below with reference to FIG. 2.

It will be understood that the glare detection circuits provided at Office B are of the same arrangement and operate in a similar manner to the arrangement and operation of the glare reduction circuits provided at Office A.

On FIG. 2 certain of the units illustrated generally in FIG. 1 are shown in greater detail in order to further describe the inventive arrangement. In particular, portions of marker 111 and sender 112 which are directly involved in the glare detection and glare reduction circuits are shown in detail as are certain portions of the two-way interoffice trunk 113. However, in order to avoid undue complication of the drawing, the delay busy arrangement provided for the trunk is not shown in detail in FIG. 2; it is believed that this arrangement has been adequately disclosed in FIG. 1 and fully described in that connection.

It will be assumed that two-way trunk 113 has been seized "outgoing," that is, for a call initiated at Office A, and that marker has selected the trunk and is establishing the usual channel connection between the calling line and the trunk. At the start of this operation following the trunk selection, marker 111 transmits a signal over the trunk to Office B which is effective to make the trunk busy to an incoming seizure by Office B. However, it frequently occurs that before the trunk is actually made busy at Office B by the transmitted signal, the trunk will be seized "incoming" from Office B before the channel connection at Office A has been completed. In order to detect such occurrence there is provided in accordance with novel features of the present invention an arrangement whereby the E lead 127 is extended via lead 138 to the marker 111 where it is continuously scanned during the time the channel connection is being established.

For purposes of further discussion, it will be assumed that, before completion of the channel connection by marker 111 and while relay 2CGI is in released condition, a ground off-hook signal is received over E lead 127 from Office B, which signal indicates that trunk 113 has been seized from that office also. This ground will be extended through the diode and break contacts 2OF–3, over lead 138, through trunk link frame 107, trunk link connector 108, break contact 2GCI–1, winding of relay 2GL to battery; relay 2GL operates over this path.

Timer 201 is started (its timing operation is initiated) when a ground is applied to its ST (start) terminal by the circuit path that is shown only diagrammatically on FIG. 2. This path is closed when the marker selects the particular outgoing trunk that is to be used in establishing an interoffice connection for the currently described call. The circuit operations relevant to the selection of a circuit, such as trunk 113, appearing on a trunk link frame are described, for example, in the aforementioned Busch patent on col. 27, lines 52 through 56. The timer 201 then starts to measure the glare detection interval which may be, for example, of the order of 100 ms.; at the end of this interval, provided relays 2GLA and 2GLB are still in released condition for reasons subsequently described, relay 2GLT will operate. The 100 millisecond interval is of significance since it normally takes approximately a minimum of 100 milliseconds for an outgoing calling office (Office A for the currently described call) to receive a signal back indicating that the incoming trunk in a forward office (Office B) has been seized and made busy in response to an outgoing trunk seizure in the calling office. With reference to the present application, a period of 100 milliseconds minimum is required for trunk 124 at Office B to return a signal indicating that it has been seized and made busy in response to an outgoing signal transmitted to Office B from trunk 113 at Office A when that trunk is selected by the marker. It is during this 100 millisecond interval that the possibility of a simultaneous seizure at Office B exists since trunk 124 is not made busy at Office B for the serving of the outgoing calls of that office until the end of the aforementioned interval. A seizure by Office B of trunk 124 prior to the 100 millisecond interval is detected by facilities at Office A upon the operation of relay 2GL in the manner described in subsequent paragraphs.

It will be noted that, with relay 2GL operated as just described, and assuming relay 2GLT to be in a released position, alternate operate paths for relays 2GLA and 2GLB are presented depending upon the operated or released conditions of relays 2SOG (class) and 2CHA. The operate paths of these two-last-mentioned relays and of relay 2CHP are not shown in detail but it will suffice for our present purpose to point out that class relay 2SOG operates when the marker is seized on a subscriber outgoing class call (but not on a tandem outgoing class call) while relays 2CHA and 2CHP operate after the marker has reached the stage in the process of channel selection commonly referred to as the "point of no return," that is, after which the marker is committed to use the selected trunk for the particular call. It will be noted that relay 2CHA can operate only if relay 2CHP operates before relay 2GL has operated. With respect to the Busch patent, the point of no return is assumed to be the time at which the marker causes the crossbar switch select magnets to be operated after having determined the specific path through the network that is to be used in establishing a connection between a calling line (or calling incoming trunk) and the selected outgoing trunk leading to Office B.

It will be assumed first that relay 2SOG is in released condition since the call is of the tandem outgoing class, and that relay 2CHA is also released since the marker has not reached the point of no return. Accordingly, relay 2GLA will operate from ground, break contact 2GLT–1, make contact 2GL–1, break contact of transfer pair 2SOG–1, winding of relay 2GLA to battery.

With relay 2GLA operated, an obvious operate path for relay 2RAV1 (route advance) is closed at make contact 2GLA–3. As explained in detail in the above-referred to A. J. Busch Patent 2,585,904, the route advance action is similar to recycle action except that in the instance of route advance an attempt is made to complete the call on a new route. Accordingly, in the manner fully described in the Busch patent, marker 111, upon operation of relay 2RAV1, will free trunk 113 from the outgoing seizure and will proceed to complete a channel connection after reorder to another trunk of the group. Trunk 113 is therefore made available for the incoming seizure and the call originating at Office B can be completed.

Also, with relay 2GLA operated as described above, an obvious operate path will be completed for sender relay 2RO (reorder). Relay 2RO, operated, closes a path for operating relay 2OF (overflow) of trunk 113 from battery, resistor 202, make contact 2RO–1, upper winding of relay 2OF, make contact 2S1A–1 to ground; relay 2OF upon operating locks to the ground through its lower winding and make contact 2OF–1.

Relay 2OF, operated, closes at make contact 2OF–2 a path for applying reorder tone from source 203 to the line for transmission back to the calling station as an indication that the call should be re-initiated. In the situation just discussed, however, the reorder tone is not actually transmitted to the calling station since the marker has route advanced to select another trunk as described.

For purposes of further description, it will be assumed now that relay 2SOG is in operated position, indicating a subscriber outgoing class call, and that relay 2CHA is also in operated position indicating that marker 111 has passed the point of no return; under this condition there is no point, of course, in initiating a route advance action as the marker has been committed to the previously selected trunk. Accordingly a reorder tone is immediately initiated.

Relay 2GLB operates from ground, break contact 2GLT–1, make contact 2GL–1, make contacts of respective transfer pairs 2SOG–1 and 2CHA–1, winding of relay 2GLB to battery; relay 2GLB operates and immediately initiates reorder by closing an operate path for relay 2RO at make contact 2GLB–2. Reorder tone from source 203 is transmitted to the calling station over a path closed at make contact 2OF–2. Route advance relay 2RAV1 does not operate at this point as relay 2GLA remains in released position.

As a further example for descriptive purposes, it will be assumed again that relay 2SOG is operated but that relay 2CHA is in released condition indicating that marker 111 has not yet reached the point of no return and that there is occasion, therefore, for route advance. Relay 2GLA will operate from ground, break contact 2GLT–1, make contact 2GL–1, make contact of transfer pair 2SOG–1, break contact of transfer pair 2CHA–1, winding of relay 2GLA to battery; relay 2GLA operates over this path but relay 2GLB does not operate as its operate path is open at the make contact of transfer pair 2CHA–1.

Relay 2GLA, operated, closes at make contact 2GLA–3 the operate path for relay 2RAV1 which operates a-d initiates the route advance action previously described. Also, a path is closed at make contact 2GLA–2 for operating relay 2RO which, upon operating, closes an operate path for relay 2OF as described above. Here again, however, the reorder tone is not actually transmitted to the calling station as the marker has route advanced.

In the event a glare condition occurs after expiration of the interval measured by timer 201 it will, in effect, be undetected since relay 2GLT will have operated and the operate path of relays 2GLA and 2GLB will be open at break contact 2GLT–1. However, the time interval during which a glare condition may go undetected in the present invention is vastly reduced over that of the prior art. As a matter of fact, it is reduced to the point where undetected glare conditions are no longer of commercial significance. It has already been mentioned that a valid answer signal from the trunk at a distant office will be received approximately 100 milliseconds minimum after the transmission forward of a trunk seizure signal from Office A to Office B. Therefore, since a valid acknowledgement signal may and normally will be received approximately 100 milliseconds later, timer 201 times this 100 milliseconds interval and at the end thereof operates relay 2GLT which opens its make contact 2GLT–1 to preclude the possibility of relays 2GLA or 2GLB being operated in response to the operation of 2GL following the end of the 100 millisecond interval. Although most acknowledgement signals will be received shortly after 100 milliseconds, the actual time interval during which such signals may be received is between 100 and 150 milliseconds and a small percentage of signals may be received near the 150 milliseconds portion of the interval. It is, therefore, necessary that the operate circuit for relays 2GLA and 2GLB be opened by the break contacts of timer relay 2GLT at the end of 100 milliseconds since shortly thereafter, a ground potential on conductor 138 may well represent a valid acknowledgement signal from Office B. The opening of break contacts 2GLT–1 precludes either of relays 2GLA or 2GLB from sequentially responding to any signal on conductor 138. If the selected trunk is of the type, due to its transmission characteristics, in which the valid acknowledgement signal is not returned until approximately 150 milliseconds has elapsed, it is possible that any new seizure of the trunk by Office B following the 100 millisecond interval and prior to the 150 millisecond interval will represent a glare condition which will go undetected since the opened break contacts 2GLT–1 precluded relays 2GLA or 2GLB from operating when relay 2GL operates from the glare potential on conductor 138. Although the theoretical possibility of such undetected glare conditions exists, the probability of their occurrence has been found, in practice, to be reduced to a negligible level that it is no longer of any commercial importance.

Prior to the operation of the timer 201, the monitoring of E lead 127, by way of the extension over lead 138 to the marker, will continue until the marker has completed the channel connection between the calling station and the selected two-way trunk 113, that is, of course, unless a glare condition is detected in the meantime as just described. At the time the channel connection through the network is established, relay 2CGI is operated by the circuitry disclosed in the Busch application in response to the operation of the hold magnets of the selected network path. The operation of relay 2CGI opens its break contacts 2CGI–1 to isolate relay 2GL from lead 138 and thereby preclude the circuitry of FIG. 2 from responding to any further potential on conductor 138 prior to the operation of a timer 201. The reason for this is that in the event that the network connection is established prior to the 100 millisecond timer interval, the circuit operations have progressed to the point where the marker would be unable to take any effective action even if a glare condition did result in a potential on conductor 138 following the establishment of the network path prior to the 100 millisecond timer interval. Thus, relay 2GCI is operated when the network path is established and its contacts 2CGI–1 preclude the subsequent operation of relay 2GL and, in turn, either of relays 2GLA or 2GLB.

Alternatively, the completion of the channel connection may not, in fact, be completed until 100 milliseconds or more time has elapsed so that normal supervision signals may already be received over E lead 127 from Office B as a result of the outgoing seizure from Office A. These signals might be construed as indication of a glare condition, that is an incoming seizure, which, of course, is undesirable. Accordingly, the operate path for relay 2GCI may additionally include a set of contacts relay 2GLT so that the 2GCI relay will operate at the end of the 100 millisecond timer interval and, by its contacts 2CGI–1, preclude the circuitry of FIG. 2 from responding to any glare potential on conductor 138 following the operation of the timer. This arrangement eliminates any difficulties that might otherwise occur if the 2GL relay were permitted to operate at this time from a ground on conductor 138.

It will be apparent from the above-description that the novel arrangement contemplated is such that, on tandem outgoing class calls with relay 2SOG released, detection of a glare condition any time before the expiration of the "glare detection interval," as measured by timer controlled relay 2GLT, will result in operation of relay 2RAV1 and initiation of route advance action. In the instance of subscriber outgoing class calls, however, where relay 2SOG is operated, the route advance action will be initiated only if the glare condition is detected before the marker has passed the point of no return as indicated by operation of relay 2CHA. If glare is detected after relay 2CHA has operated, only the reorder action will be initiated since relay 2GLB rather than 2GLA will operate. This desirable scheme of operation results from the novel manner in which transfer contact pairs of the 2SOG and 2CHA relays are included in the operate paths of relays 2GLA and 2GLB.

When relay 2OF operates, as described above, lead 138 is opened at break contact 2OF–3 in order to remove ground from the E lead to the marker and verify the trunk and sender functions. Also, at this point the "stop" signal to the distant sender is held through the make contact of transfer pair 2OF–4 until the trunk circuit attaches a register at which time relay 2OF releases.

While the combination of the temporary artificial busy and continuous monitoring of the E lead has proven to be a particularly effective expedient in alleviating trouble due to glare conditions, it will be understood that either means may be used independently of the other. For example, the monitoring arrangement may, on occasion, be the sole alleviating means provided.

It is to be understood that the above-described arrangements are illustrative of the application of the principles of the invention. Numerous other arrangements may be devised by those skilled in the art without departing from the spirit and scope of the invention.

What is claimed is:

1. In a telephone system, a first central office and a second central office, a plurality of two-way trunks for establishing connections between said offices, a signal lead associated with each of said trunks for transmitting seizure signals thereover between said offices, a marker at said first office responsive to the initiation of a call thereat for selecting and seizing an idle one of said trunks, for transmitting a busy signal over said selected trunk to said second office, and for establishing a channel connection between a calling line that initiated said call at said first office and the first office end of said selected trunk, means for extending the signaling lead associated with said selected trunk to said marker, and means in said marker responsive to the selection of said trunk for monitoring said signaling lead in order to detect a seizure of said trunk by said second office before said trunk has been made busy at said second office in response to the busy signal transmitted from said first office marker.

2. The system of claim 1 in combination with means associated with each of said trunks and effective upon the termination of a call over a selected trunk for temporarily placing an artificial busy indication on said trunk at the office end at which the terminated call had originated.

3. The system of claim 1 in which said monitoring means includes a first relay operated by a signal applied to said signal lead in response to the seizure of said trunk by said second office within a predetermined interval subsequent to the selection of said trunk by said marker.

4. The system of claim 3 in combination with means responsive to the operation of said first relay for transmitting a reorder tone to said calling station at said first office to signify that that currently attempted call cannot be completed.

5. The system of claim 4 in combination with a second relay and a third relay, an operate path for each of said two last-mentioned relays, said operate paths having a common portion which includes a make contact of said first relay whereby the closures of said operate paths are controlled in part by operation of said first relay.

6. The system of claim 5 in combination with a timer controlled relay, and a break contact of said timer controlled relay included in said common portion of said operate paths whereby said paths are interrupted by the operation of said timer controlled relay after the elapse of said predetermined measured interval following the selection of said trunk by said marker.

7. The system of claim 6 in combination with a fourth relay, means for operating said fourth relay when the establishment of said channel connection by said marker has reached a predetermined stage, and contact means effective upon operation of said fourth relay when said first relay is operated and said timer controlled relay is released for closing the operate path of said third relay and for interrupting a portion of the operate path of said second relay, said contact means being effective to operate said second relay when said first relay is operated and said timer controlled relay and said fourth relay are both in a released state.

8. The invention of claim 7 in combination with means effective upon operation of either said second relay or said third relay for effecting the operation of said reorder tone transmitting means.

9. The system of claim 8 in combination with route advance means included in said marker and means effective upon operation of said second relay for activating said route advance means to cause another trunk to be selected for the serving of said call.

10. The system of claim 9 in combination with, an additional relay, means for operating said additional relay in the event said channel connection has not been established before expiration of a second predetermined interval, and means effective upon operation of said additional relay for rendering ineffective said means for extending said signaling lead.

11. The system of claim 9 in combination with a class relay, means for operating said class relay on a particular class of call, and means effective upon operation of said class relay for interrupting a portion of the operate path of said second relay and for closing a portion of the operate path of said third relay.

12. In a telephone system, a pair of central offices having two-way trunks for establishing connections between said offices, a signal lead associated with each trunk for transmitting signals thereover between offices, a control circuit at each office for selecting and seizing an idle one of said trunks, for transmitting a busy signal thereover to the other office, and for establishing an intraoffice channel connection between a calling line and said selected trunk, and means at one office effective subsequent to said selection of said trunk for determining the operation of said control circuit at said one office upon detecting that said selected trunk has been seized at said other office before said trunk has been made busy at said other office by the busy signal transmitted from said one office.

13. The system of claim 12 in which said determining means includes a lead for extending said signal lead associated with the selected trunk to said control circuit of said one office and a relay in said one office control circuit for monitoring said signaling lead to detect signals applied to the signaling lead of said selected trunk by said other office.

14. In a telephone system, a first and a second central office interconnected by a plurality of two-way trunks, a signal lead associated with each of said trunks in each of said offices for transmitting signals between said offices, means including a marker at said first office responsive to the initiation of a call thereat for selecting and seizing an idle one of said trunks, for transmitting a busy signal thereover to said second office, and for establishing an intraoffice channel connection between a calling line and the first office end of the selected trunk, means for extending the signaling lead associated with the selected trunk to the marker, and means in said marker responsive to the selection of said trunk for monitoring its signaling lead in order to detect a seizure of said selected trunk by said second office before said selected trunk is made busy at said second office in response to the reception of said busy signal from said first office, and means responsive to the detection of a seizure by said monitoring means for controlling the subsequent operations of said marker in serving said call.

15. The system of claim 14 in combination with means for disabling said monitoring means a predetermined time after the selection of said trunk by said marker.

16. The system of claim 15 in which said disabling means includes a timer for measuring a predetermined interval beginning with the selection of said trunk, said timer being effective to activate said disabling means upon the termination of said interval.

17. The system of claim 16 in combination with means responsive to the detection of a seizure of said selected trunk by said second office during said predetermined interval for releasing said selected trunk and for extending said call to said second office over another one of said trunks.

18. The system of claim 16 in combination with means responsive to the detection of a seizure of said selected trunk by said second office during said predetermined interval for returning a tone to the calling line signifying that the currently attempted call cannot be completed.

19. The system of claim 16 in combination with means effective during said predetermined interval and responsive to the detection of a seizure of said selected trunk by said second office after said marker has proceeded beyond a predetermined point in its function of establishing said channel connection for returning a tone to the calling party signifying that the currently attempted call cannot be completed.

20. The system of claim 16 in combination with means effective during said predetermined interval and responsive to the detection of a seizure of said selected trunk by said second office prior to the time said marker has proceeded beyond a predetermined point in its function of establishing said channel connection for releasing said selected trunk and for extending said call to said second office over another one of said trunks.

No references cited.

KATHLEEN H. CLAFFY, Primary Examiner

T. W. BROWN. Assistant Examiner